April 3, 1956
E. T. HOWES
2,740,945
SEISMIC PROSPECTING SYSTEM
Filed July 6, 1953
4 Sheets-Sheet 1
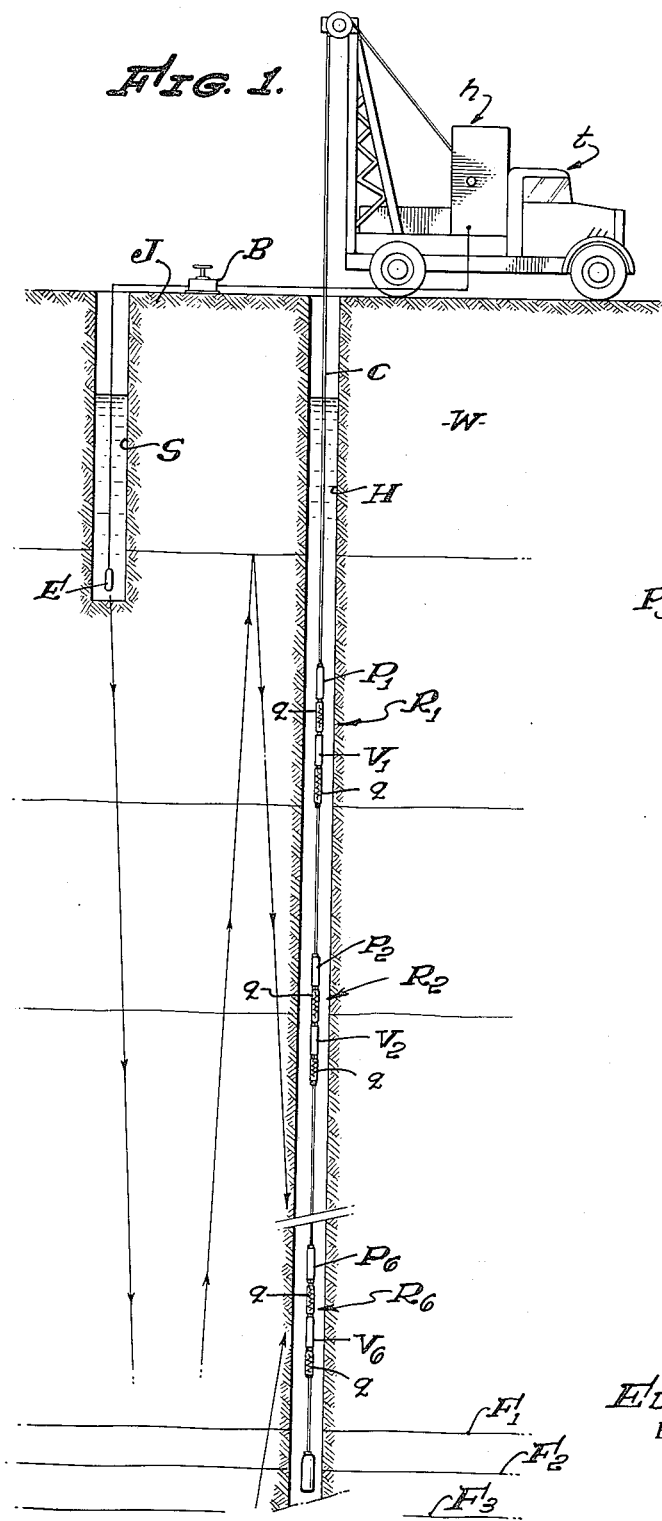
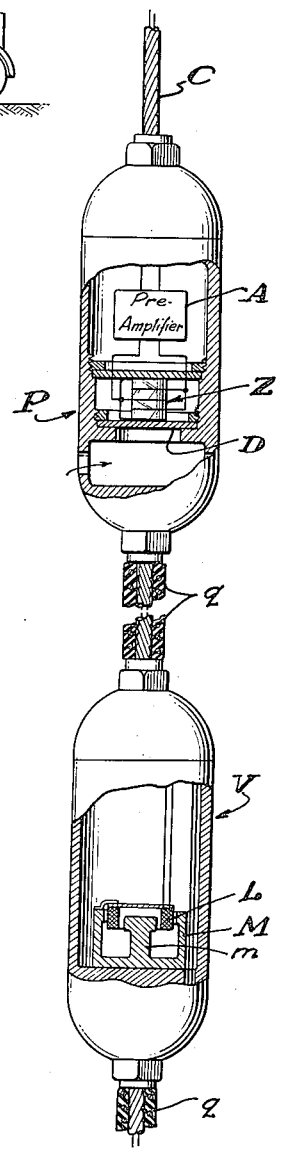
INVENTOR.
EDGAR T. HOWES,
BY
Reed C. Lawlor
ATTORNEY

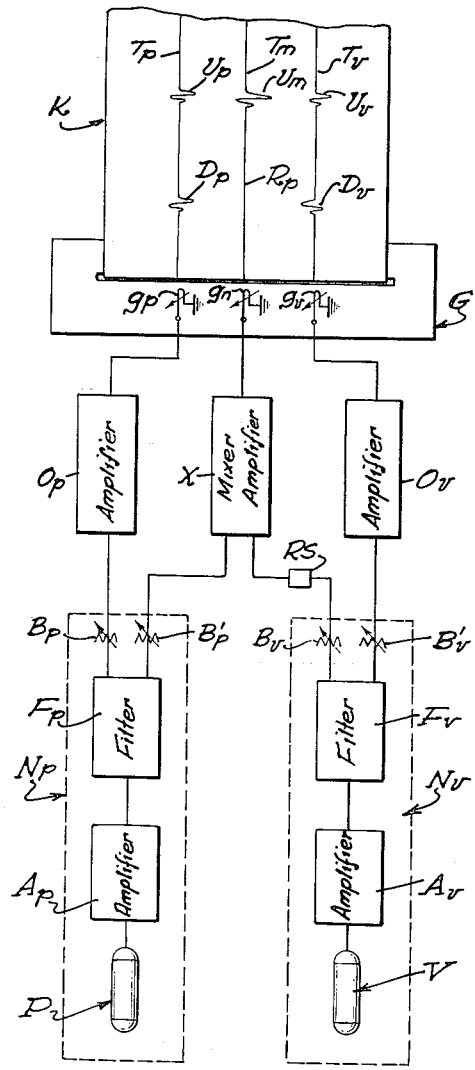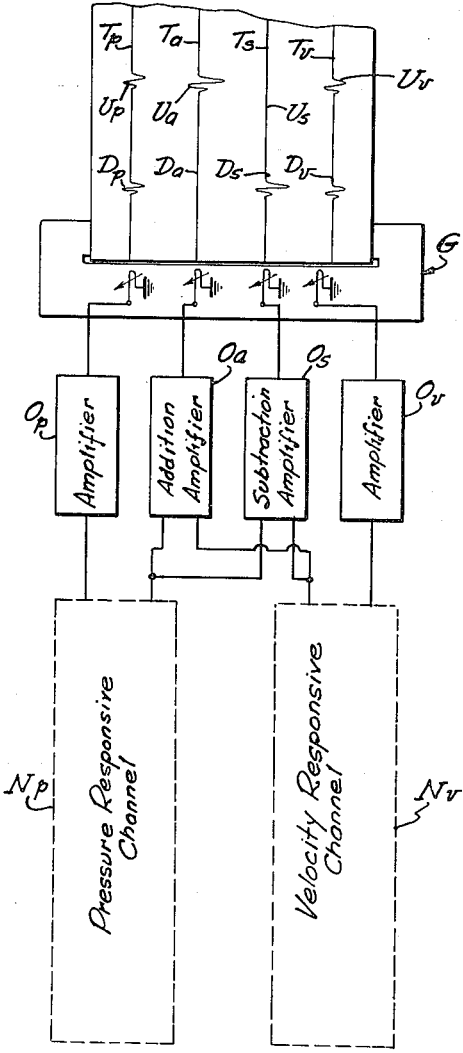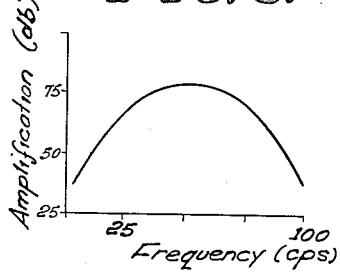

FIG. 7.

| | Wave | Pressure Trace ($T_p$) | Addition Trace ($T_a$) | Subtraction Trace ($T_s$) | Velocity Trace ($T_v$) |
|---|---|---|---|---|---|
| $W_A$ | Downwardly-Travelling wave with Compression first break. | ⌇ | ⌇ | | ⌇ |
| $W_B$ | Upwardly-Travelling wave with Compression first break. | ⌇ | | ⌇ | ⌇ |
| $W_C$ | Downwardly-Travelling wave with rarefaction first break. | ⌇ | ⌇ | | ⌇ |
| $W_D$ | Upwardly-Travelling wave with rarefaction first break. | ⌇ | | ⌇ | ⌇ |
| $W_E$ | Horizontally-Travelling wave with Compression first break. | ⌇ | ⌇ | ⌇ | |
| $W_F$ | Horizontally-Travelling wave with rarefaction first break. | ⌇ | ⌇ | ⌇ | |
| $W_G$ | Wave Travelling at 45° Downwardly with Compression first break. | ⌇ | ⌇ | ⌇ | ⌇ |
| $W_H$ | Wave Travelling at 45° upwardly with Compression first break. | ⌇ | ⌇ | ⌇ | ⌇ |

April 3, 1956
E. T. HOWES
2,740,945
SEISMIC PROSPECTING SYSTEM
Filed July 6. 1953
4 Sheets-Sheet 4
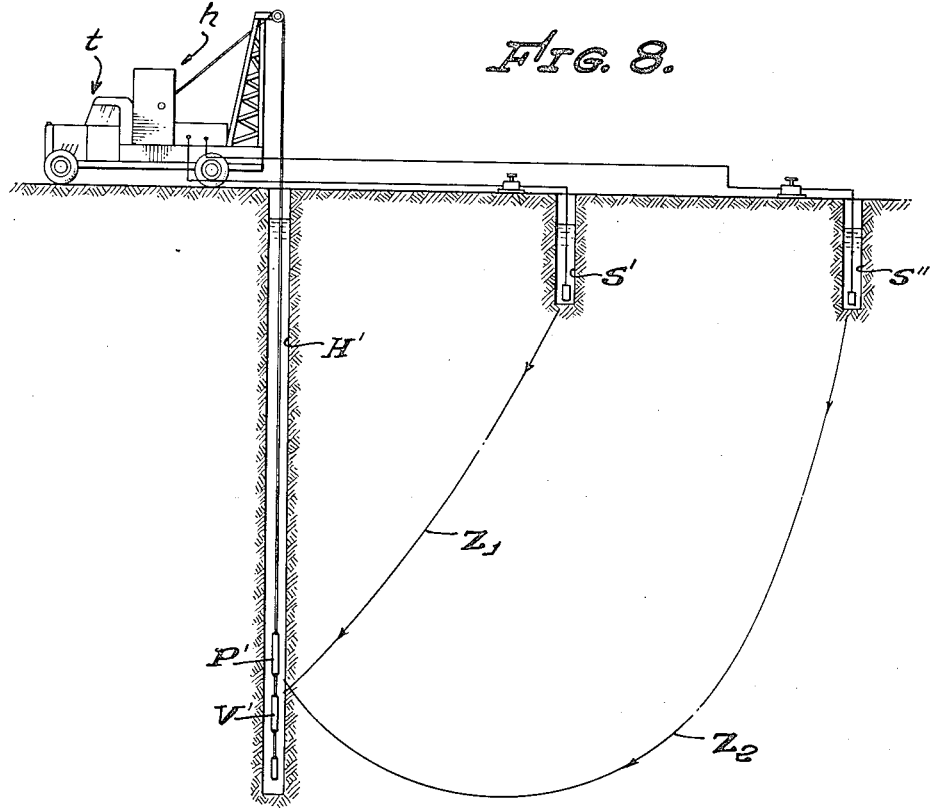
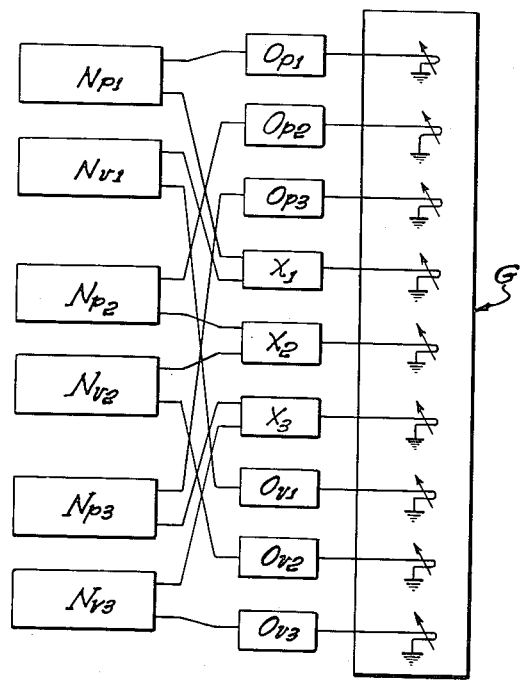
EDGAR T. HOWES,
INVENTOR.
BY
ATTORNEY.

United States Patent Office 2,740,945
Patented Apr. 3, 1956

2,740,945

SEISMIC PROSPECTING SYSTEM

Edgar T. Howes, Pasadena, Calif., assignor, by mesne assignments, to United Geophysical Corporation, Pasadena, Calif., a corporation of California Application July 6, 1953, Serial No. 366,172

13 Claims. (Cl. 340—15)

This invention relates to geophysical prospecting systems, and more particularly to improvements in methods and apparatus employed in seismic surveying.

In reflection seismic surveying, seismic waves that are generated at generating points, or, as they are more commonly called "shotpoints," adjacent the surface of the earth travel downwardly through the earth. As the downwardly-travelling waves encounter various reflecting surfaces between successive subsurface strata, they are partially reflected upwardly. The resulting upwardly-travelling waves are also partially reflected downwardly when they encounter reflecting surfaces between successive strata. Furthermore, when reflected seismic waves reach the surface of the earth or the bottom of the weathered layer, they are reflected there too.

In a system of reflection seismic surveying that has been described and claimed in copending patent application, Serial No. 319,969, filed by Raymond A. Peterson on November 12, 1952, the reflected seismic waves are received at a plurality of mutually spaced seismic wave receiving stations that are arranged beneath the weathered layer in a substantially straight vertical line that is spaced horizontally from the shotpoint. In the records made of the waves received at such seismic wave receiving stations there are components that represent upwardly-travelling waves and other components representing downwardly-travelling waves. Though the latter components are generally of smaller amplitude than the former, nevertheless their presence frequently makes the analysis of the traces difficult. Other waves travelling over still other paths also reach the seismic wave receiving station.

Generally speaking, most of the waves which affect a seismometer located at a seismic wave generating station, either at the surface of the earth or in a shallow receiver hole, are in the form of longitudinal waves; that is, the direction of movement of the particles in the wave is parallel to the direction of travel of the waves. When such a wave passes a point in an elastic medium, such as that constituting the formations adjacent the receiver hole, and when they travel through the receiver hole at any particular point in the wave front, each particle affected by the wave moves with an undulating velocity characteristic of the wave. In a small region at each such point, the elastic medium, whether it be solid or fluid, is also subjected to an undulating stress or pressure that is likewise characteristic of the waves.

According to this invention, both a pressure-sensitive seismic wave detector and a velocity-sensitive seismic wave detector are employed at a seismic wave receiving station. The resultant outputs of the two detectors are either compared or combined in order to determine information regarding the direction of arrival of the waves or to render the system suitable for differentiating between various waves, such as longitudinal waves travelling in one direction from longitudinal waves travelling in the opposite direction. In one form of the invention, the outputs of the two detectors are recorded as separate traces by means of a multiple-element galvanometer and the traces are compared to ascertain the direction of travel of the wave. In another form of the invention, the two detectors form parts of corresponding channels which have substantially identical frequency-response characteristics and the outputs of these channels are either added together or subtracted from each other, or both, and a record is made of the combined signal. In this way a record is obtained which is free of components travelling in one direction but which includes components which travel in the other direction. In still another form of the invention, the individual outputs, as well as the combined outputs, are recorded, thus producing a record that may be employed to differentiate between various kinds of waves.

While the invention is described herein with particular reference to its application to reflection seismic surveying of the type disclosed and claimed in said copending patent application, Serial No. 319,969, it will be understood that it may be applied to other systems in which it is desired to differentiate between seismic waves travelling in one direction from seismic waves travelling in the opposite direction. Furthermore, though this specification emphasizes the application of the invention to differentiate between upwardly-travelling and downwardly-travelling longitudinal waves, it will be understood that the invention may also be employed to identify and study other waves too.

The combination of elements representing the present invention will be set forth with particularity in the appended claims. The invention itself, however, both as to its organization and method of operation, together with various objects, advantages, and uses thereof will be best understood by reference to the following description, taken in connection with the accompanying drawings, in which:

Fig. 1 is a vertical cross-sectional view of a portion of the earth to which the invention is applied;

Fig. 2 is a schematic diagram illustrating the operation of the invention;

Fig. 3 is a graph of the frequency-response characteristics of one of the channels;

Fig. 4 is a schematic diagram of a system employing the invention;

Fig. 5 is a schematic diagram of another system employing the invention;

Fig. 6 is a schematic diagram of still another system employing the invention;

Fig. 7 is a vertical cross-sectional view of a portion of the earth in which the invention is employed in well shooting; and Fig. 8 is a chart showing the forms of records of some sets of waves obtained with this invention.

Referring to the drawing and particularly to Fig. 1, there is illustrated an arrangement in which the present invention is applied to the system of reflection seismic surveying disclosed and claimed in copending patent application, Serial No. 319,969. In the embodiment of the invention there illustrated, a set of seismic waves is generated by detonation of a charge of explosive E located at the bottom of a shothole S. Usually the bottom of the shothole is located beneath the bottom of the weathered layer W. The set of waves so generated travels downwardly in the earth, being partially reflected from various reflecting surfaces $F_1$, $F_2$, $F_3$ located beneath the surface of the earth. The upwardly-travelling waves are received at a plurality of seismic wave receiving stations $R_1 \ldots R_6$ located in a receiver hole H that has been drilled into the earth a substantial distance such as a few hundred feet deeper than the shothole S. Parts of the waves that are reflected upwardly from the reflecting surfaces $F_1$, $F_2$ and $F_3$ are subsequently reflected downwardly, either from the bottom of the weathered layer V or from the surface of the earth A, and these downwardly-travelling waves are also received at the receiver stations $R_6 \ldots R_1$. The downwardly-travelling waves are, of course, received at the seismic wave receiving station in the opposite order from the upwardly-travelling waves.

At each of the seismic wave receiving stations $R_1$ there is located a corresponding pair of seismic wave detectors $P_i$ and $V_i$ where $i$ equals 1 . . . 6. Thus, for example, at the uppermost seismic wave receiving station $R_1$ there is located the pair of seismic wave detectors $P_1$ and $V_1$. At the seismic wave receiving stations $R_1$ there is located a pair of seismic wave detectors $P_1$ and $V_1$, etc. In the following description, the subscripts $i$ are omitted when the description applies equally well to the detectors at all the seismic wave receiving stations. One seismic wave detector P at each seismic wave receiving station R is pressure-sensitive, while the other seismic wave detector V located at the same receiving station is a velocity-sensitive detector.

As illustrated in Fig. 2, the pressure-responsive detector P at each receiving station may be of the type in which a series of piezo-electric crystals Z are mounted in operative relationship to a flexible diaphragm D which is exposed to liquid in the shothole H. The diaphragm D forms part of the wall of the housing of the detector P.

A preamplifier A located in each pressure detector housing is employed to match the impedance of the stack of piezo-electric crystals with the conductors in the cable C to which the output of the crystals is applied. In such a pressure-sensitive seismic wave detector, electromotive forces are generated at the output thereof which correspond, both in frequency and amplitude, to the changes in pressure in the liquid in which the pressure-sensitive detector is immersed.

As illustrated in Fig. 2, the velocity-responsive detector V at each receiving station may be of the type in which a coil L is resiliently suspended in an air gap of an armature M that comprises a permanent magnet element $m$. The coil L and armature M are mounted within a case which is adapted to be lowered into a receiver hole H. The amature M is secured to the case and the coil L is movable relative thereto.

As illustrated here, the coil L is mounted for movement along a substantially vertical axis. In such a velocity-sensitive detector, a voltage is generated in the coil which is proportional to the relative velocity of the coil and the case. Thus, when the case is immersed in a fluid in a well and is subjected to movement under the influence of waves entering the receiver hole, the velocity-sensitive detector will move with the liquid and will have a velocity that varies with the velocity of movement of the liquid as it undulates under the influence of the seismic wave. In practice, the mechanical resonant frequency of the coil suspended within the velocity-sensitive detector is usually made lower than the frequency of any of the components of the seismic waves which are to be recorded. Also, in practice, the average density of the velocity-sensitive detector V is made no more than a few times the density of the fluid in which the detector is to be immersed. Furthermore, the velocity-sensitive detector is damped either by means of oil or by electrical means, both of such damping arrangements being well known. Under such circumstances, each of the velocity-sensitive detectors V produces at its output an undulating electromotive force, the amplitude of which varies with the amplitude of the undulating velocity of the fluid in which it is immersed.

According to the present invention, the velocity-sensitive detectors V and the pressure-sensitive detectors P are arranged alternately along the length of a cable C which is supported in the receiver hole by means of a hoist $h$ on a truck $t$.

In order to insulate the velocity-sensitive detectors from any vibrations that might otherwise travel thereto along the length of the cable, springs $q$, or other suitable resilient means, are employed to provide the mechanical connections between the upper and lower ends of the velocity-sensitive detectors V and the neighboring parts of the string of instruments. As explained more fully in copending patent application, Serial No. 366,271, filed by Edgar T. Howes on July 6, 1953, the velocity-sensitive detectors V may be insulated vibrationwise from other parts of the system by employing springs whose compliance is such that the mechanical resonant frequency of the velocity-sensitive detectors V is very low compared to the frequencies of any components of the seismic waves that are to be recorded. In said copending application, there are illustrated and claimed arrangements of springs which may be employed and which nevertheless make it possible to provide electrical communication between parts below the springs and parts above them. Thus, wherever necessary, conductors in cable C are provided to supply power to the pressure-sensitive detectors P and other conductors are employed to transmit electromotive forces from the velocity-sensitive detectors V and the pressure-sensitive detectors P to amplifying and recording apparatus carried by the truck $t$.

It can be shown that the instantaneous value of the change in pressure occurring in any small region of the liquid in the receiver hole H is substantially proportional to the instantaneous value of the velocity $v$ of the wave travelling therethrough. However, as shown below, the change in pressure may be in phase with the particle velocity $v$ or in opposite phase, depending upon the direction of travel of the waves.

The velocity-sensitive detector V is so calibrated and connected that upward velocities of the detector produce positive voltages at its output. In that case, downwardly-travelling waves produce negative voltages at the output of the velocity-sensitive detector. The pressure-sensitive detector P of the type employed here may be calibrated to produce positive voltages at its output in response to a positive change of pressure, or compression, and a negative voltage in response to a negative change in pressure, or rarefaction. It can be shown that if the particle velocity at a point in any medium is in the same direction as the direction of travel of the wave, a compression exists at that point, but that if it is in the opposite direction, a rarefaction exists at that point. Taking into account the foregoing, it can therefore be shown that for such waves, the pressure $p$ at a point is related to the particle velocity $v$ at that point by the equation $$p=kv$$

if the wave is travelling upwardly, but by the equation $$p=-kv$$

if the wave is travelling downwardly, where $k$ is a constant, depending on the properties of the well fluid.

According to this invention, the outputs of the pair of detectors at a seismic wave receiving station are compared or combined in such a way as to differentiate between longitudinal seismic waves which are travelling upwardly from such waves which are travelling downwardly and otherwise to aid in studying the seismic waves.

In practice, the two detectors P and V of each pair are spaced apart only a distance which is small compared to the wavelength of any of the components of the seismic waves to be detected. Thus, for example, the detectors P and V of each pair may be located only a few feet apart or less in order to permit recording of seismic wave components that have wavelengths of twenty-five feet or more. On the other hand, the spacing between pairs is somewhat greater, usually being ten feet to fifteen feet or more apart. By virtue of the fact that the pressure-sensitive detector and the velocity-sensitive detector are close together, pressure and velocity events occurring at the two of them may be considered as occurring at the same time and in almost the same or opposite phase. Accordingly, in comparing and combining waves travelling either upwardly or downwardly in the earth, account need not generally be taken of the time delay involved in the travel of the wave from one of the detectors to another of the same pair or in the phase lag of the instruments in response to changes in the pressure or velocity of the surrounding liquid.

It can also be shown that changes in pressure in a receiver hole H are linearly related to changes in stress in the surrounding earth formations, and that the velocity of fluid in the hole is linearly related to the velocity of particles in the neighboring earth formation. Thus, the output of the pressure-sensitive detector and the output of the velocity-sensitive detector provide indications of the instantaneous values of the changes in stress and of the particle velocity of the surrounding earth formations.

In Fig. 4 there is illustrated schematically an arrangement for recording both the output of a pressure-sensitive detector P, the output of a velocity-sensitive detector V and a combination of the outputs thereof. This system includes a pressure-responsive channel $N_p$ and a velocity-responsive channel $N_v$. The pressure-responsive channel $N_p$ includes a pressure-sensitive detector P, an amplifier $A_p$ and a filter $F_p$ connected together in the order named. Similarly, the velocity-responsive channel $N_v$ includes a velocity-sensitive detector V, an amplifier $A_v$ and a filter $F_v$ arranged in the order named. The two channels $N_p$ and $N_v$ are so designed that they have substantially identical frequency-response characteristics when said detectors are immersed in well fluid. Such identical frequency-response characteristics include both the frequency-amplitude characteristics and the frequency-phase characteristics. In practice, so long as minimum-phase elements are employed as detectors, amplifiers and filters, the frequency-phase characteristics will be identical if the frequency-amplitude characteristics are identical. Such a condition generally exists in the system described if the electrical networks in the amplifiers and filters are of ladder configuration, or their equivalent. A frequency-amplitude characteristic of the general character employed is illustrated in Fig. 3 where ordinates represent amplification or response in decibels (db) and abscissa represent frequency in cycles per second (C. P. S.).

As a general rule, the pressure-sensitive detector P will have an output which is substantially uniform over a wide range of frequencies, but the response of the velocity-sensitive detector may vary somewhat, especially at low frequencies. In such a case, substantial identity of frequency-response characteristics is achieved by introducing suitable filters $F_p$ and $F_v$ which are different, but which equalize or compensate for the difference in characteristics of the two detectors P and V. Since methods of designing such equalizing filters are well known to those skilled in the art, they are not described here. The filters $F_p$ and $F_v$ are also designed so as to attenuate low-frequency components of the seismic waves and high-frequency components of the seismic waves that lie outside the main band of frequencies which are to be recorded. The two amplifiers $A_p$ and $A_v$ are of substantial identical characteristics. If desired, one of the filters may be omitted if broad-band amplification of the seismic waves is desired.

The outputs of the two channels $N_p$ and $N_v$ are applied through corresponding output amplifiers $O_p$ and $O_v$ to recording elements $g_p$ and $g_v$ of a multiple-element oscillograph G. Potentiometers $B_p$ and $B_v$, or other suitable means are employed for adjusting the amplitudes of the signals applied to the corresponding recording elements $g_p$ and $g_v$.

The outputs of the two channels $N_p$ and $N_v$ are also applied to the input of a mixer amplifier X, and the output of this mixer amplifier is applied to another recording element $g_n$ of the multiple-element oscillograph G. A pair of potentiometers $B'_p$ and $B'_v$ are employed at the outputs of the recording channels $N_p$ and $N_v$ for proportioning the amounts of the outputs of the two channels which are applied to the mixer amplifier. A reversing switch RS is located between the output of one of the channels $N_p$ or $N_v$ and the input of the mixer amplifier X so that the outputs of the two channels $N_p$ and $N_v$ may be mixed, either in the same phase or opposite phase.

On the record K produced by the multiple-element oscillograph G there are shown three traces $T_p$, $T_m$ and $T_v$ corresponding, respectively, to the outputs of the three amplifiers $O_p$, X and $O_v$. The undulations on these traces represent the response of the system to simple seismic wave pulses, one travelling upwardly and another travelling downwardly. The pulses under consideration comprise a compression followed by a slightly smaller dilatation and then followed by a still smaller compression. As there shown, the upwardly-travelling wave is recorded as a wave $U_p$ on the trace $T_p$ produced by the output of the pressure-responsive channel $N_p$, and as a wave $U_v$ on the trace $T_v$ produced by the output of the velocity-responsive channel $N_v$. Here it will be noted that the two recorded waves $U_p$ and $U_v$ are in phase with each other, the compression and upward particle velocities producing displacement on the traces $T_p$ and $T_v$ in the same direction, and likewise dilatation and downward particle velocities producing displacements also in the same direction but opposite to the foregoing. The corresponding combined output from the mixer amplifier is shown as a wave $U_m$ on the trace $T_m$ that records the output of the mixer amplifier X. Here it is assumed that the outputs of the two channels $N_p$ and $N_v$ are applied in equal amounts and in the identical phase relationship to the input of the mixer amplifier X. The equality of amplitude is achieved by adjustment of the potentiometers $B'_p$ and $B'_v$ at the input of the mixer amplifier X. The identity of the shapes of the waves $U_p$ and $U_v$ is attained by virtue of the equality of response of the two channels $N_p$ and $N_v$. The identity of phase or polarity is produced by suitable setting of the reversing switch RS.

Also shown on the record K are waves $D_p$ and $D_v$ corresponding to the output of the pressure and velocity channels $N_p$ and $N_v$ for a downwardly-travelling wave. Here it will be noted that the two recorded waves have the same magnitude and shape but are of opposite phase or polarity. In this case, the output of the mixer amplifier X is zero as indicated by the absence of a wave at the point $R_p$ of the record. In practice, a small residual wave may exist because of the fact that a slight time lag or other small phase difference exists between the arrival of a wave at the pressure-sensitive detector P and at the velocity-sensitive detector V. However, the amplitude of such a residual wave is generally very small.

It will be noted that if the reversing switch RS had been set in its alternate position, a wave would have been recorded on the trace $T_m$ representing the downwardly-travelling wave, but no record would have been obtained corresponding to the upwardly-travelling wave.

In Fig. 5 there is shown an arrangement in which the output of the pressure-responsive and velocity-responsive channels $N_p$ and $N_v$ are applied to an addition amplifier $O_a$ and a subtraction amplifier $O_s$ as well as to corresponding individual output amplifiers $O_p$ and $O_v$. In this case the outputs of the four amplifiers $O_p$, $O_a$, $O_s$ and $O_v$ are recorded as separate corresponding traces $T_p$, $T_a$, $T_s$ and $T_v$ by means of the multiple-element galvanometer G. In this case, assuming the outputs of the two channels $N_p$ and $N_v$ are applied in equal amounts to the addition amplifier $O_a$ and the subtraction amplifier $O_s$, the upwardly-travelling wave produces traces $U_p$ and $U_a$ and $U_v$ on the traces $T_p$, $T_a$ and $T_v$, but no wave on the trace $T_s$. Also, in this case, the downwardly-travelling waves produce waves $D_p$, $D_s$ and $D_v$ on the traces $T_p$, $T_s$ and $T_v$, but none on the trace $T_a$. In this case, it will be noted, that the addition trace $T_a$ indicates only the upwardly-travelling components of the waves arriving at the seismometer, while the trace $T_s$ indicates only the downwardly-travelling components of those waves.

In practice, of course, the train of waves arriving at the receiving stations R are much more complex than the simple waves represented on the records of Figs. 3 and 4. However, it will be clear from the foregoing explanation that it is possible to combine the outputs of a pair of detectors, one being pressure-sensitive and the other being velocity-sensitive, to eliminate from the record either the downwardly-traveling waves or the upwardly-travelling waves. Thus, for example, in the system of Fig. 1, if the waves produced at the outputs of the various pairs of detectors are properly combined in accordance with the principles set forth above, records may be made of the upwardly-travelling waves free of any disturbances from the downwardly-travelling waves. By making records in this manner, more accurate determinations may be made of the times of arrival of the upwardly-travelling waves that reach the various seismic wave receiving stations.

If desired, the waves received at the various seismic wave receiving stations R may be mixed in the manner described above, and the mixed waves from the respective receiving stations R recorded as separate traces in side-by-side relationship by a multiple-element oscillograph without recording the individual waves received by the detectors at the respective receiving stations R. In this case, the effects of the waves travelling downwardly may be completely eliminated. On the other hand, the waves received at the various pressure-sensitive detectors and those received at the various velocity-sensitive detectors may be recorded as adjacent pairs of traces by means of a multiple-element oscillograph. In this case, by comparing the traces, both upwardly-travelling and downwardly-travelling waves may be identified.

In Fig. 6 there is illustrated a system in which the outputs of the various pressure-responsive channels $N_{p1}$, $N_{p2}$ and $N_{p3}$ are each recorded as separate traces after amplification by individual output amplifiers $O_{p1}$, $O_{p2}$ and $O_{p3}$, respectively. Also in this case, the outputs of the various velocity-responsive channels $N_{v1}$, $N_{v2}$ and $N_{v3}$ are recorded as separate traces after passage through corresponding output amplifiers $O_{v1}$, $O_{v2}$ and $O_{v3}$. Also in this case, the outputs of each pair of corresponding pressure-responsive and velocity-responsive channels are applied to corresponding mixing amplifiers to form corresponding traces. Thus, the outputs of the first pair of channels $N_{p1}$ and $N_{v1}$ are combined in a mixer amplifier $X_1$ and the second pair of channel $N_{p2}$ and $N_{v2}$ are combined in a mixer amplifier $X_2$ and a third pair of channels $N_{p3}$ and $N_{v3}$ are combined in a third mixer amplifier $X_3$. The mixer channels $X_1$, $X_2$ or $X_3$ may either be addition amplifiers or substraction amplifiers as may be desired. Also, of course, both addition and substraction amplifiers may be employed with each pair of channels in accordance with the principles set forth in the description of Fig. 5.

In any of the systems described above, it is possible to compare the traces produced by the outputs of a pressure-responsive channel with the output of a velocity-responsive channel to obtain valuable information regarding the seismic waves arriving at a seismic wave receiving station. However, in other cases, it is desirable to record mixed traces and in this case, if desired, the traces representing the outputs of the individual pressure-responsive and velocity-responsive channels may frequently be omitted while still attaining some of the advantages of the invention.

Generally speaking, the first lobe or half wave of the seismic wave which travels outwardly from a shotpoint is in the form of a compression. Sometimes, however, the first break of the wave that arrives at a seismic wave receiving station is not a compression, but is a rarefaction. Such a rarefaction may be identified in the output of the pressure-sensitive detector regardless of the direction of travel of the wave, and information as to whether the wave is travelling upwardly or downwardly may then be ascertained from the output of the velocity-sensitive detector. However, if only one of the detectors is employed to detect a wave, this information cannot be ascertained.

In Fig. 7 there is shown a series of waves and the corresponding records obtained on the pressure trace $T_p$, the addition trace $T_a$, the substraction trace $T_s$, and the velocity trace $T_v$. In the first column the particular waves which have been recorded are described. In the second column the trace $T_p$ obtained from the output of the pressure-responsive output amplifier $O_p$ is shown. In the third column the trace $T_a$ obtained from the output of the addition amplifier $O_a$ is shown. In the fourth column the trace $T_s$ obtained from the output of the subtraction amplifier $O_s$ is shown. In the fifth column the trace $T_v$ obtained from the output of the velocity-responsive output amplifier $O_v$ is shown.

In the traces, as shown, compressions and downward particle velocities produce deflections to the right while rarefaction and upward particle velocities produce deflections to the left and time progresses downwardly. For convenience, the waves are referred to as positive or negative according to whether the first break is to the right or the left, and the amplitudes are compared with the amplitudes of vertically-travelling waves. The relative amplitudes and polarities of the waves shown in Fig. 7 represent waves as recorded if the various parts of the apparatus are suitably calibrated.

The waves $W_A$, $W_B$, $W_C$ and $W_D$ are vertically-travelling waves. The waves $W_E$ and $W_F$ are horizontally-travelling waves. The waves $W_G$ and $W_H$ are waves which arrive at the seismic wave receiving station at an angle of 45°. Some of the waves have a compression first break and some of them have a rarefaction first break.

Considering first the vertically-travelling waves, the wave $W_A$ travels vertically downwardly and has a first break which is a compression. In this case, a positve wave of 1.0 amplitude is recorded on the pressure trace $T_p$, a positive wave of 2.0 amplitude is recorded on the addition trace $T_a$, a wave of zero amplitude is recorded on the subtraction trace $T_s$, and a positive wave of 1.0 amplitude is recorded on the velocity trace $T_v$. The wave $W_B$ travels vertically upwardly and has a first break which is a compression. In this case, a positive wave of 1.0 amplitude is recorded on the pressure trace $T_p$, a wave of zero amplitude is recorded on the addition trace $T_a$, a wave of 2.0 amplitude is recorded on the subtraction trace $T_s$ and a negative wave of 1.0 amplitude is recorded on the velocity trace $T_v$. The wave $W_C$ travels vertically downwardly and has a first break which is a rarefaction. In this case, a negative wave of 1.0 amplitude is recorded on the pressure trace $T_p$, a negative wave of 2.0 amplitude is recorded on the addition trace $T_a$, a wave of zero amplitude on the subtraction trace $T_s$ and a negative wave of 1.0 amplitude is recorded on the velocity trace $T_v$. The wave $W_D$ travels vertically upwardly and has a first break which is a rarefaction. In this case, a negative wave of 1.0 amplitude is recorded on the pressure trace $T_p$, a wave form of zero amplitude is recorded on the addition trace $T_a$, a wave of 2.0 amplitude is recorded on the subtraction trace $T_s$ and a wave of 1.0 amplitude is recorded on the velocity trace $T_v$.

It will be noted that for vertically-travelling waves, it may be determined whether the wave has a compression first break or a rarefaction first break and whether it is travelling upwardly or downwardly by comparing any two of the four traces.

Considering now the horizontally-travelling waves, the wave $W_E$ travels horizontally and has a first break which is a compression. In this case, a positive wave of 1.0 amplitude is recorded on the pressure trace $T_p$, on the addition trace $T_a$, and on the subtraction trace $T_s$, and a wave of zero amplitude is recorded on the velocity trace T$_V$. The wave W$_F$ also travels horizontally but has a first break which is a rarefaction. In this case, a negative wave of 1.0 amplitude is recorded on the pressure trace T$_P$, on the addition trace T$_a$, and on the subtraction trace T$_s$, and a wave of zero amplitude is recorded on the velocity trace T$_V$. It is seen that it is very easy to distinguish between a vertically-travelling wave and a horizontally-travelling wave from the traces, and in any case whether it is a rarefaction or a compression. Again, an examination of any two traces is sufficient.

Considering now the waves that travel at an angle of 45° with respect to the vertical, the wave W$_G$ travels downwardly and has a first break which is a compression. In this case, a positive wave of 1.0 amplitude is recorded on the pressure trace T$_P$, a positive wave of 1.7 amplitude is recorded on the addition trace T$_a$, a wave of 0.3 amplitude is recorded on the subtraction trace T$_s$, and a positive wave having an amplitude of 0.7 is recorded on the velocity trace T$_V$. The wave W$_H$ travels upwardly and has a first break which is a compression. In this case, a positive wave of 1.0 amplitude is recorded on the pressure trace T$_P$, a positive wave of 0.3 amplitude is recorded on the addition trace T$_a$, a wave of 1.7 amplitude is recorded on the subtraction trace T$_s$ and a negative wave of 0.7 amplitude is recorded on the velocity trace T$_V$. Records may also be obtained of waves travelling at 45° which are rarefactions. These waves are also readily distinguished.

From the foregoing, it may readily be seen that the nature of the first break and the angle with which the wave approaches the seismic wave receiving station may be ascertained from the records. Generally speaking, the angle of $\theta$ of the wave as measured from the vertical is given by the relationship:

$$\cos \theta = \frac{v}{p}$$

where $v$ and $p$ are amplitudes of the velocity and pressure waves. It will be noted that when $v$ and $p$ are of opposite signs, the wave is travelling upwardly, but if they are of the same sign, it is travelling downwardly. This equation and this invention are applicable, of course, to any part of the wave at any instant and is not limited in its application to first breaks.

In Fig. 8 there is illustrated an arrangement in which seismic waves generated at the bottom of a shothole S' are received by means of a pressure-sensitive detector P' and a velocity-sensitive detector V' in a well or receiver hole H'. In this particular case, the waves arrive at the detectors along a path Z$_1$ that is downwardly directed at the reception point. In the same figure, there is illustrated an arrangement in which waves generated at a second shothole S'' are received by the detectors along a path Z$_2$ that is upwardly directed at the reception point.

In view of the foregoing explanation, it is readily seen that by recording the waves received by both the pressure-sensitive detector and the velocity-sensitive detector, it may be ascertained directly from the record whether the wave is arriving along a downwardly-directed path or an upwardly-directed path. The angle of arrival of the wave at the reception point is also readily determined. Thus, an uncertainty so often present in the interpretation of seismic data is removed.

Though the invention has been described above only with reference to particular embodiments thereof, it will be understood that it may be employed in other embodiments. More particularly, other types of pressure-sensitive detectors and velocity-sensitive detectors and pressure-responsive channels and velocity-responsive channels may be employed. Also, more particularly, other arrangements of shotpoints and seismic wave receiving points may be employed. Also, other methods of comparing and combining the records may be employed.

It is therefore to be understood that the invention is not limited to the specific embodiments thereof described herein, but that it may be embodied in many other forms within the scope of the appended claims.

What is claimed is:

1. In apparatus for seismic prospecting, a pressure-responsive channel including a pressure-sensitive seismic wave detector, a velocity-responsive channel including a velocity-sensitive seismic wave detector, means for supporting said detectors at points of the earth that are spaced apart a distance that is small compared with the lengths of the seismic waves to be detected, and means for detecting differences in the outputs of said channels occurring when a seismic wave is received by both detectors, whereby the sense of travel of seismic waves past said points may be determined.

2. In apparatus for seismic prospecting, a pressure-responsive channel including a pressure-sensitive seismic wave detector, a velocity-responsive channel including a velocity-sensitive seismic wave detector, means for supporting said detectors at points in the earth, said points being spaced apart a distance that is small compared with the lengths of the seismic waves to be detected, and means for recording the outputs of said channels when such a seismic wave is received by both detectors, whereby the sense of travel of seismic waves past said points may be determined.

3. In apparatus for seismic prospecting, a pressure-responsive channel including a pressure-sensitive seismic wave detector, a velocity-responsive channel including a velocity-sensitive seismic wave detector, means for combining the output of said channels, and means for recording the combined output of said channels.

4. In apparatus for seismic prospecting, a pressure-responsive channel including a pressure-sensitive seismic wave detector, a velocity-responsive channel including a velocity-sensitive seismic wave detector, said channels having substantially identical frequency-response characteristics, means for subtracting a fraction of the output of one channel from a fraction of the ouput of the other channel, and means for recording the resultant obtained from such subtraction.

5. In apparatus for seismic prospecting, a pressure-responsive channel including a pressure-sensitive seismic wave detector, a velocity-responsive channel including a velocity-sensitive seismic wave detector, means for subtracting a fraction of the output of one channel from a fraction of the output of the other channel, and means for recording the individual outputs of said channels and also the combined output of said channels as a function of time.

6. In apparatus for seismic prospecting, a pressure-responsive channel including a pressure-sensitive seismic wave detector, a velocity-responsive channel including a velocity-sensitive seismic wave detector, means for supporting said detectors at points in a well containing liquid, said points being spaced apart a distance that is small compared with the lengths of the seismic waves to be detected, and means located at the surface of the earth for recording the outputs of said channels when such a seismic wave is received by both detectors, whereby the sense of travel of seismic waves past said points may be determined.

7. In apparatus for seismic prospecting, a pressure-responsive channel including a pressure-sensitive seismic wave detector, a velocity-responsive channel including a velocity-sensitive seismic wave detector, said channels having substantially identical frequency-response characteristics when said detectors are immersed in well fluid, means for supporting said detectors at points in a well containing liquid, said points being spaced apart a distance that is small compared with the lengths of the seismic waves to be detected, and means for detecting differences in the outputs of said channels occurring when a seismic wave is received by both detectors, whereby the sense of travel of seismic waves past said points may be determined.

8. In apparatus for seismic prospecting, a pressure-reponsive channel including a pressure-sensitive seismic wave detector, a velocity-responsive channel including a velocity-sensitive seismic wave detector, said channels having substantially identical frequency-response characteristics when said detectors are immermsed in well fluid, means for supporting said detectors at points in a well containing liquid, said points being spaced apart a distance that is small compared with the lengths of the seismic waves to be detected, and means located at the surface of the earth for recording the combined outputs of said channels, whereby the sense of travel of seismic waves past said points may be determined.

9. In apparatus for seismic prospecting, a pressure-responsive channel including a pressure-sensitive seismic wave detector, a velocity-responsive channel including a velocity-sensitive seismic wave detector, said channels having substantially identical frequency-response characteristics when said detectors are immersed in well fluid, means for supporting said detectors at points in a well containing liquid, said points being spaced apart a distance that is small compared with the length of the seismic waves to be detected, means for combining the outputs of said channels, and means located at the surface of the earth for recording the combined outputs of said channels, whereby the sense of travel of seismic waves past said points may be determined.

10. In apparatus for seismic prospecting, a pressure-responsive channel including a pressure-sensitive seismic wave detector, a velocity-responsive channel including a velocity-sensitive seismic wave detector, said channels having substantially identical frequency-response characteristics when said detectors are immersed in well fluid, means for supporting said detectors at points in a well containing liquid, said points being spaced apart a distance that is small compared with the lengths of the seismic waves to be detected, means for subtracting a fraction of the output of one channel from a fraction of the output of the other channel, and means for recording the resultants obtained from such subtraction, whereby the sense of travel of seismic waves past said points may be determined.

11. In apparatus for seismic prospecting, a plurality of pressure-responsive channels, each including a pressure-sensitive seismic wave detector, a plurality of corresponding velocity-responsive channels, each including a velocity-sensitive seismic wave detector, means for supporting said detectors in the earth with corresponding detectors spaced relatively close to each other and non-corresponding detectors spaced relatively far apart, the spacing between said corresponding detectors being small compared with the lengths of the seismic waves to be detected, and means for detecting differences between the outputs of each pair of corresponding channels connected respectively to corresponding detectors, whereby the sense of travel of seismic waves past said points may be determined.

12. In apparatus for seismic prospecting, a plurality of pressure-responsive channels, each including a pressure-sensitive seismic wave detector, a plurality of corresponding velocity-responsive channels, each including a velocity-sensitive seismic wave detector, means for combining the outputs of each pair of corresponding channels, and means for separately recording the combined output of the respective pairs of corresponding channels.

13. In apparatus for seismic prospecting, a plurality of pressure-responsive channels, each including a pressure-sensitive seismic wave detector, a plurality of corresponding velocity-responsive channels, each including a velocity-sensitive seismic wave detector, means for supporting said detectors in the earth with corresponding detectors spaced relatively close to each other and non-corresponding detectors spaced relatively far apart, the spacing between said corresponding detectors being small compared with the lengths of the seismic waves to be detected, and means for recording the outputs of said channels as seismic waves travel past the respective detectors, whereby the sense of travel of seismic waves past said points may be determined.

References Cited in the file of this patent

UNITED STATES PATENTS

| | | |
|---|---|---|
| 2,257,187 | Owen | Sept. 30, 1941 |
| 2,614,166 | Piety | Oct. 14, 1952 |
| 2,654,874 | Press | Oct. 6, 1953 |
| 2,657,373 | Piety | Oct. 27, 1953 |
| 2,658,578 | Oliphant | Nov. 10, 1953 |